US009627983B2

(12) United States Patent
Chen et al.

(10) Patent No.: US 9,627,983 B2
(45) Date of Patent: Apr. 18, 2017

(54) CIRCUIT SUPPRESSING EXCESSIVE CURRENT IN STARTUP PHASE OF A VOLTAGE CONVERTER AND METHOD THEREOF

(71) Applicant: Alpha and Omega Semiconductor (Cayman) Ltd., Sunnyvale, CA (US)

(72) Inventors: Yu-Ming Chen, Hsinchu (TW); Jung-Pei Cheng, Zhubei (TW); Pei-Lun Huang, Xhubei (TW)

(73) Assignee: Alpha & Omega Semiconductor (Cayman), Ltd., Sunnyvale, CA (US)

( * ) Notice: Subject to any disclaimer, the term of this patent is extended or adjusted under 35 U.S.C. 154(b) by 0 days.

(21) Appl. No.: 14/788,177

(22) Filed: Jun. 30, 2015

(65) Prior Publication Data
US 2016/0181930 A1    Jun. 23, 2016

(30) Foreign Application Priority Data

Dec. 17, 2014  (CN) .......................... 2014 1 0790882

(51) Int. Cl.
*H02M 3/335* (2006.01)
*H02M 1/36* (2007.01)

(52) U.S. Cl.
CPC ......... *H02M 3/33507* (2013.01); *H02M 1/36* (2013.01)

(58) Field of Classification Search
CPC ......... H02M 3/33507; H02M 3/33515; H02M 3/33576; H02M 3/33592; H02M 3/33523
USPC .......................................... 363/21.12–21.18
See application file for complete search history.

(56) References Cited

U.S. PATENT DOCUMENTS

| | | | |
|---|---|---|---|
| 5,317,499 A | * | 5/1994 | Brakus .............. H02M 3/33546 363/127 |
| 6,862,194 B2 | | 3/2005 | Yang et al. |
| 6,940,320 B2 | | 9/2005 | Sukup et al. |
| 7,265,999 B2 | | 9/2007 | Murata et al. |
| 8,213,192 B2 | | 7/2012 | Konecny et al. |
| 8,508,960 B2 | | 8/2013 | Chen et al. |
| 2004/0155639 A1 | | 8/2004 | Mobers |
| 2009/0040796 A1 | | 2/2009 | Lalithambika et al. |
| 2009/0141523 A1 | | 6/2009 | Sugawara |
| 2011/0069420 A1 | | 3/2011 | Chiu et al. |
| 2011/0216559 A1 | | 9/2011 | Ng et al. |
| 2012/0274299 A1 | | 11/2012 | Chang et al. |

(Continued)

FOREIGN PATENT DOCUMENTS

| | | |
|---|---|---|
| CN | 201450456 U | 5/2010 |
| CN | 103986336 A | 8/2014 |

(Continued)

*Primary Examiner* — Adolf Berhane
*Assistant Examiner* — Afework Demisse
(74) *Attorney, Agent, or Firm* — Lance A. Li; Chein-Hwa Tsao; 5Suns

(57) ABSTRACT

A control circuit and the control method for controlling the current voltage converter of a power conversion system in the start-up phase are disclosed. A first voltage is applied to the non-inverting input terminal of the comparator and a reference voltage is applied to the inverting input terminal of the comparator. When the first voltage exceeds the reference voltage, the comparison result from the comparator triggers the frequency of the clock signal generated by the oscillator to reduce preventing the primary current flowing through the primary winding of the transformer exceeding a pre-set value.

12 Claims, 5 Drawing Sheets

(56) References Cited

U.S. PATENT DOCUMENTS

2013/0057323 A1 3/2013 Spini et al.
2013/0114307 A1* 5/2013 Fang .................. H02M 1/32
 363/21.01
2013/0223108 A1 8/2013 Xu

FOREIGN PATENT DOCUMENTS

CN 203840204 U 9/2014
TW I437238 B 5/2014

* cited by examiner

CIRCUIT SUPPRESSING EXCESSIVE CURRENT IN STARTUP PHASE OF A VOLTAGE CONVERTER AND METHOD THEREOF

CROSS-REFERENCE TO RELATED APPLICATIONS

This application claims the priority benefit of a Chinese patent application number 201410790882.6 filed Dec. 17, 2014 by a common inventor of this Application. The entire Disclosure made in the Chinese patent application number 201410790882.6 is hereby incorporated by reference.

FIELD OF PRESENT INVENTION

The present invention primarily relates to power conversion systems, in particular, to a control circuit and control methods for controlling the primary current of the voltage converter used in power supply field during the start-up phase.

BACKGROUND OF RELATED ART

Conventional power conversion systems usually use power supply switching in constant voltage or constant current control mode. In a power conversion system, turning on or off of controlling switching elements on the primary winding of a transformer can periodically generate currents on the winding passing the switching elements, while the energy on the primary side is transmitted to the secondary side, and an AC current generated on the secondary windings is rectified and filtered passing through diodes and capacitors and converted into a DC voltage supplying to loads.

In start-up of a Flyback converter, because output voltage supplied to loads from the output terminal is far lower than the target voltage, a conventional feedback mechanisms adjusts the switch on the primary winding to operate under a maximum duty to give more power, incurring a large amount of inrush current that may exceed the capacity of each device on the primary side, bringing a high risk of damaging the switch and other devices. The existing technologies to prevent the large amount of inrush current are to add a soft start circuit on the power supply system to increase the start up time so that the voltage increases relatively smoothly. This can alleviate the inrush current to some extent, but it cannot eliminate the problem entirely. U.S. Patent Publication US20120274299 proposes to add a regulating circuit to adjust the PWM signal; however, the addition of the regulating circuit increases costs and makes the whole circuit more complex, and when it is under heavy load condition, each cycle will trigger the protection, as such this method is not applicable, and this system would produce sub-harmonic. It is within this context that embodiments of the present invention arise.

BRIEF DESCRIPTIONS OF THE DRAWINGS

Figure 1:
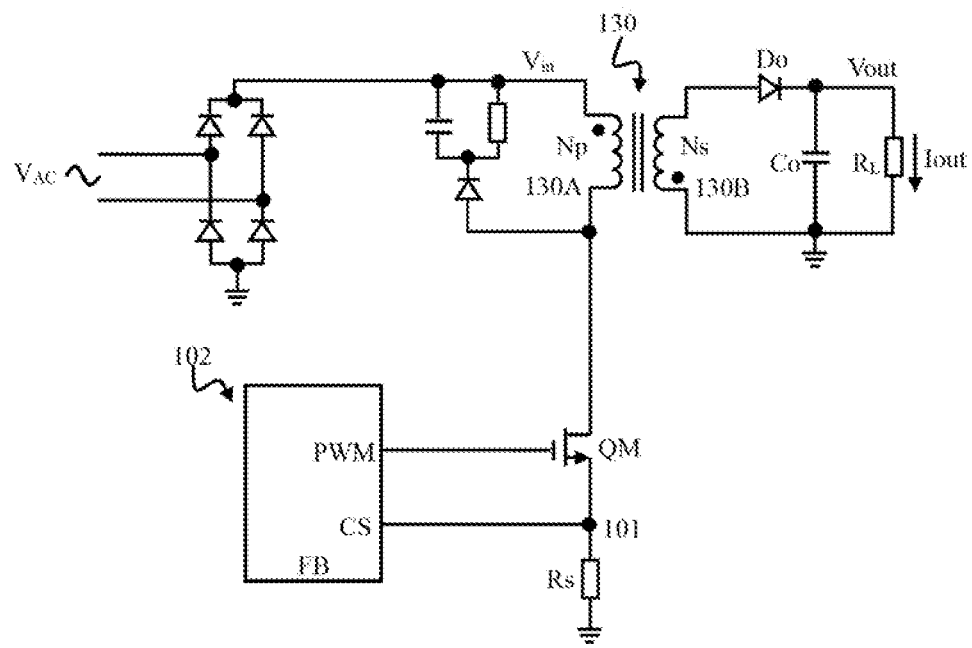
Figure 2:
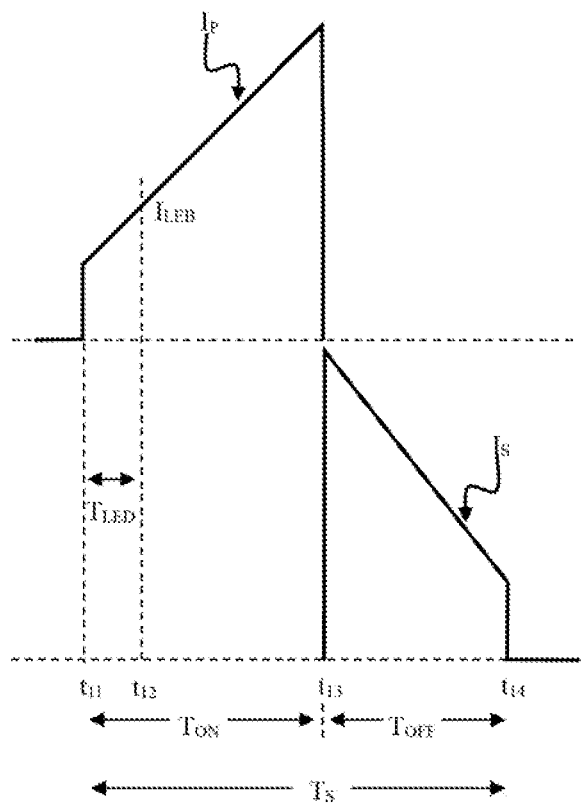
Figure 3:
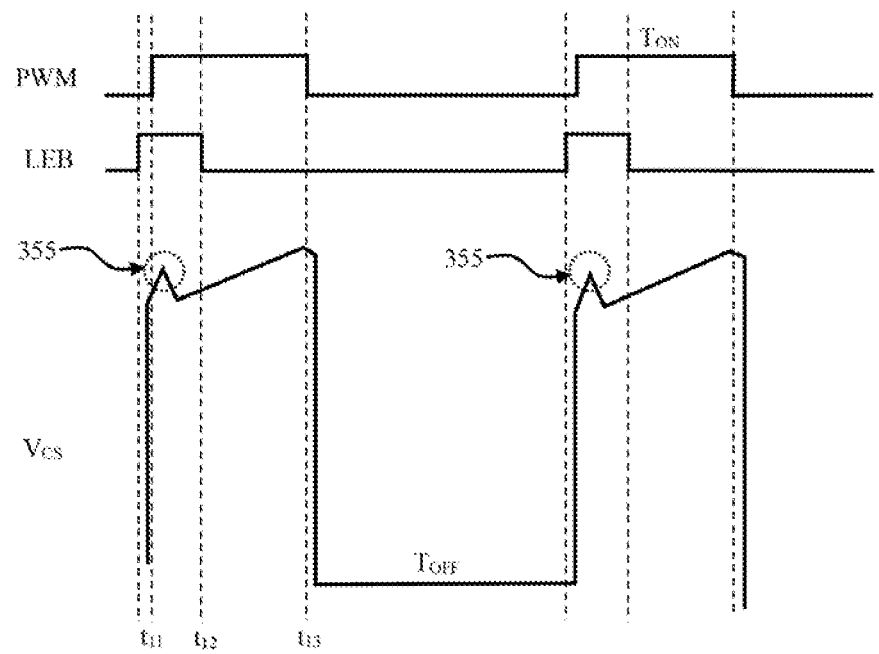
Figure 4:
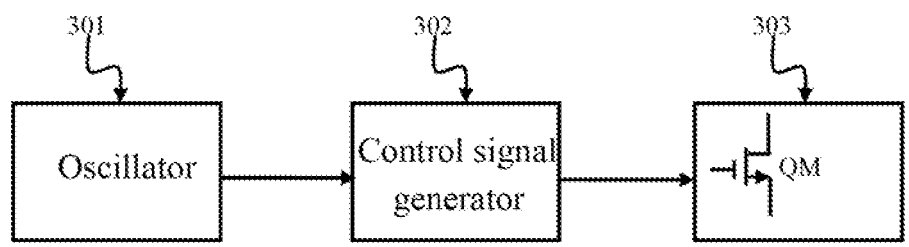
Figure 5:
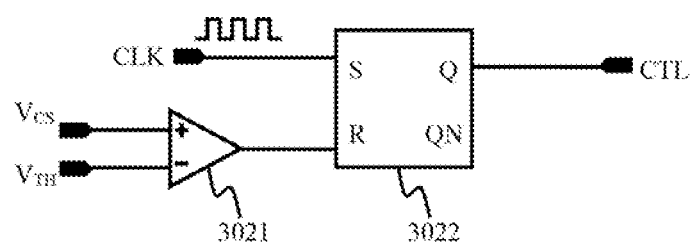
Figure 6:
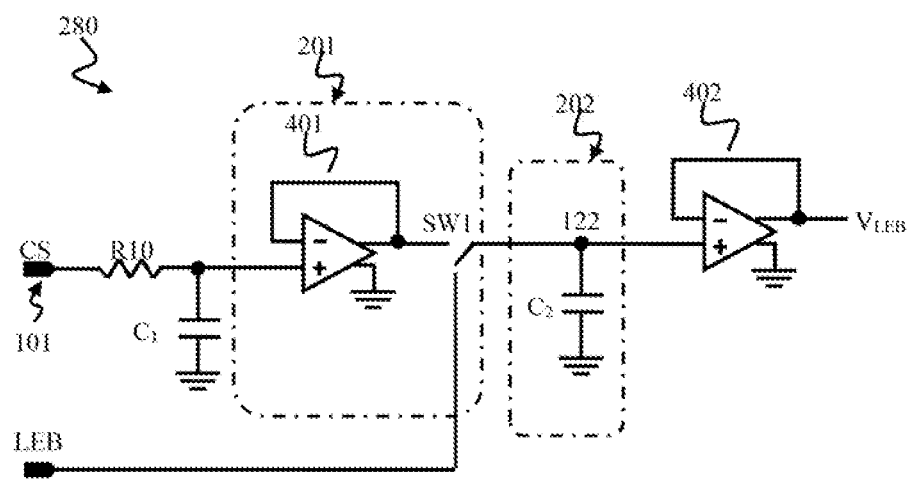
Figure 7:
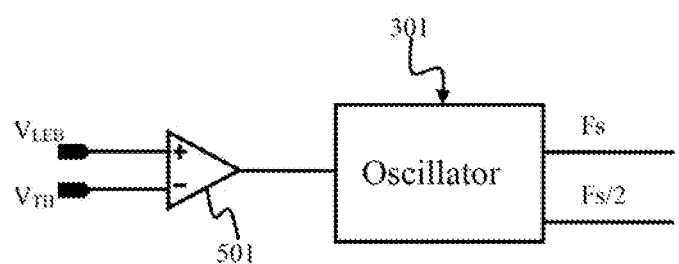
Figure 8:
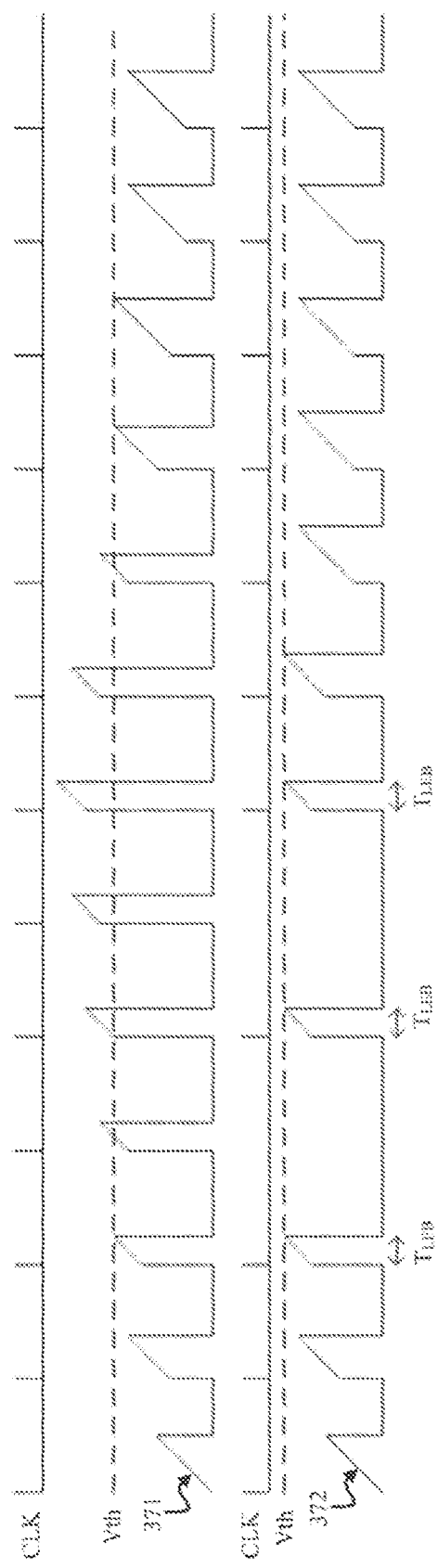
Figure 9:
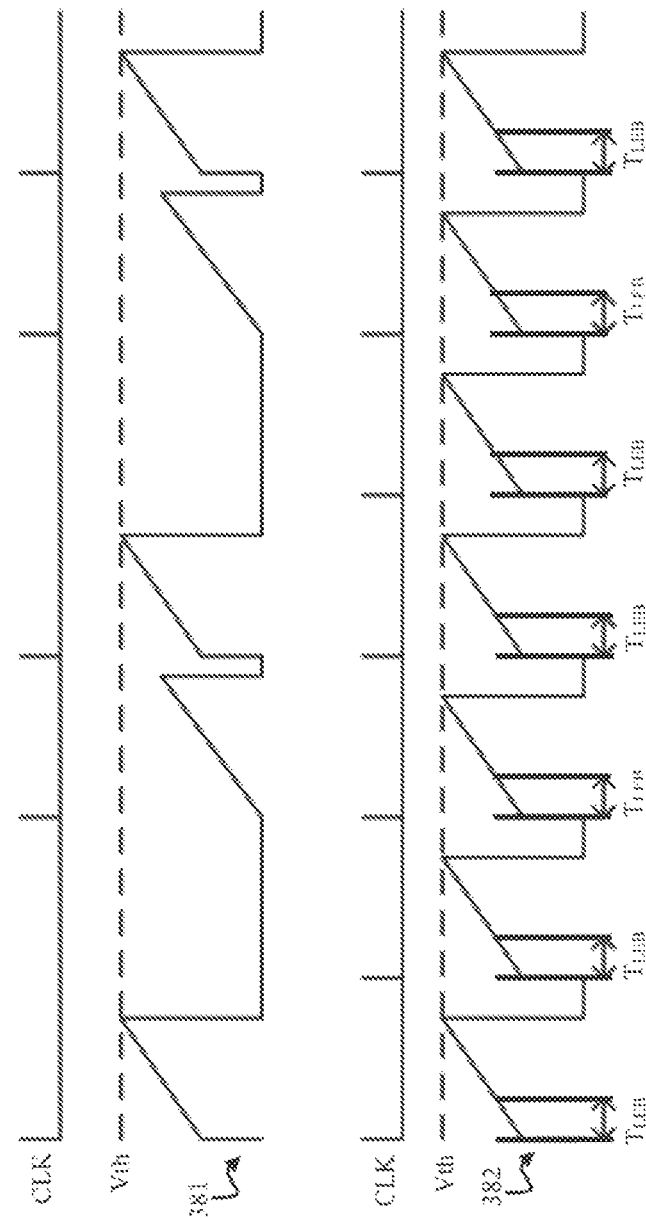

Features and advantages of the invention will be apparent after reading the following detailed description with reference to the following drawings:

FIG. 1 is a circuit diagram of the Flyback converter;
FIG. 2 is a waveform diagram of the primary current at end of leading edge blanking signal (LEB);
FIG. 3 shows a blanking signal waveform used to mask leading edge initial spike of the sensing signal at the moment the main switch is turning on;
FIG. 4 is a block diagram showing an example of controlling the signal generator receiving a clock signal to drive the power stage;
FIG. 5 is a circuit diagram showing an example of controlling the signal generator producing a control signal;
FIG. 6 is a circuit diagram showing an acquisition unit to collect the voltage sensing signal that is applied on the inductive resistor;
FIG. 7 is a circuit diagram illustrating the comparison of voltage on the inductive resistor with the reference voltage at end of the leading edge blanking signal to determine the output frequency; and
FIGS. 8-9 are waveform diagrams showing the comparison of the primary current reflected waveform when current suppressing method is used and when the method is not used.

DESCRIPTIONS OF THE SPECIFIC EMBODIMENTS

FIG. 1 is the circuit configuration of a Flyback converter of the present invention. A main switch QM controlling the primary side of transformer 130 may be a power MOSFET with an input terminal of drain electrode and an output terminal of source electrode and a control terminal of gate electrode. The control terminal of the main switch QM receives a control signal sent from main control module 102 and correspondingly turns on or turns off the main switch QM to control the current passing through the primary winding 130A on the transformer 130 of the Flyback converter to transfer energy from the primary side to the secondary side. The primary winding 130A receives input DC voltage $V_{IN}$, which is generated from AC voltage $V_{AC}$ through a rectification with bridge rectifier. Transformer 130 also has a secondary winding 130B for delivering output voltage $V_{OUT}$, whose polarity is contrary to that of the primary winding 130A. The secondary winding 130B is connected with a rectifying filtering circuit comprising a diode $D_O$ and a capacitor $C_O$, during switching off period of the main switch QM, the transformer current is transferred from the primary side to the secondary side, and the resulting secondary current $I_S$ passes the secondary winding 130B to charge the capacitor $C_O$ through the forward conducting diode $D_O$ to produce output $V_{OUT}$ on Flyback converter. DC output voltage $V_{OUT}$ is applied on load $R_L$ generating output current $I_{OUT}$ flowing through load $R_L$. In the feedback loop of the converter, there is a sense resistor $R_S$ between the source electrode of the main switch QM and ground, and the source electrode and the ungrounded terminal of the sense resistor $R_S$ are connected at node 101, and the sense resistor $R_S$ is used to test the primary current $I_P$ passing through the primary winding 130A and thus provide the inner feedback voltage with a value equals to $I_P$ multiplies $R_S$ (i.e., $V_{CS}=I_P \times R_s$), as such the sensing signal reflected as a voltage value $V_{CS}$. The primary current $I_P$ can be used to characterize the secondary current Is passing through the secondary winding 130B after conversion. Real-time detection of sensing signal $V_{CS}$ on the sensing resistor $R_S$ at the induction port CS of the main control module 102 can be performed according to the primary current $I_P$ signal of the primary winding 130A, which can be used as the basis of determining whether it is necessary to adjust the control signal to turn on or turn off the main switch QM. The circuit diagrams and specific modes of operation of the Flyback converter are well known in the art and will not be described here.

FIG. 2 shows a sketch of the waveform of primary current $I_P$ flowing through the primary winding 130A and the secondary current $I_S$ flowing through the secondary winding 130B. Although the present invention is explained with current continuous (CCM) mode as the example, it is also applicable for current discontinuous (DCM) mode. Turning on or off of the main switch QM is driven by pulse width modulation signal PWM and other similar control signals, and the primary current $I_P$ starts to increase steadily at $t_{11}$ (startup of a cycle) TO and it reaches to a peak value at time point $t_{13}$ when the main switch QM is turned off. Time period from $t_{11}$ to $t_{13}$ is the on-period $T_{ON}$ of the main switch QM, while time period from $t_{13}$ to $t_{14}$ is the off-period $T_{OFF}$ of QM, and the secondary current $I_S$ attenuates from $t_{13}$ to $t_{14}$, until a whole cycle $T_S$ ends at $t_{14}$.

As shown in FIG. 3, an LEB (Leading edge blanking) circuit, which is well known in the art, is used typically to avoid unnecessary misoperation in detection of the primary current $I_P$. In the primary current controlled loop, initial pulse peak of the primary current $I_P$ often occurs at the moment when the main switch QM is turned on. The initial spike can be fed to the main control module 102 at the sense port CS, if the current on sense resistor $R_S$ at this time is used as the sense signal $V_{CS}$ to control the switch, the unexpected initial spike 355 of sense signal $V_{CS}$ in FIG. 3 may cause misoperation and start the over current protective mechanism mistakenly causing the main control module 102, used to generate the control signal, not to send modulation signal correspondingly and thus turning off the main power switch QM wrongly even though no abnormal condition of the over current is occurred. The variable or fixed leading edge blanking signal LEB generated from the conventional leading edge blanking circuit is used to eliminate the risk of the false triggering, and the signal can be connected to the control terminal of the main switch QM to ensure the LEB signal will not turn off the main switch QM during the period when the LEB signal has high logic level, and to sample current signal on sense resistor $R_S$ after completion of LEB to obtain actual and accurate primary value of sense signal $V_{CS}$, and to shield the initial pulse peak of the primary current $I_P$ during the time period when the main switch QM is turned on using LEB signal. It is well known in the art that the LEB signal is used to filter out the initial spike of the primary current $I_P$ occurring at the moment when the main switch QM turns on and when $I_P$ starts to flow and generates the initial spike, which consequently filters out the sense current initial spike generated at node 101 on the ungrounded end of the sense resistor $R_S$. Design of LEB circuit is well known in the art, thus the existing programs of the existing technologies will not be described here, and for more detailed description, conventional power supply design manual, U.S. Pat. No. 8,278,830 and U.S. Pat. No. 8,300,431 and other literatures can also be referred.

As shown in FIG. 2 and FIG. 3, after the main switch QM was turned on, it is necessary to measure an instantaneous current value of the primary current $I_P$ flowing through the sense resistor $R_S$ at the moment of LEB signal transferring from high logic level to low logic level, for example at the time $t_{12}$. The instantaneous current value sampled on primary current $I_P$ can be marked as $I_{LEB}$, which represent the instantaneous voltage value applied on $R_S$ at this moment, and the sample method will be described in detail thereinafter.

As shown in FIG. 4, in the voltage converter, an oscillator 301 sends a clock signal CLK to a control signal generator 302, and the generator 302 that functions similarly to the main control module 102 thus generates the corresponding control signal CTL to turn on or turn off the switch QM in power output stage 303, where the input voltage $V_{IN}$ is converted into output voltage $V_{OUT}$ supplying to loads. The frequency of CLK signal determines the switching cycle of the switch QM in the power output stage 303. By way of example and not by way of limitation, as shown in FIG. 5, the control signal generator 302 may comprise a comparator 3021 and an RS flip-flop 3022, where the clock signal CLK generated by the oscillator 301 is sent to the set terminal S of RS flip-flop 3022, and the output terminal of the comparator 3021 is connected to the reset terminal R of RS flip-flop 3022 so that the control signal CTL is generated to drive the main switch QM to turn on or off at the Q output terminal of the RS flip-flop 3022. The rising edge of the clock signal CLK may set the Q output terminal of RS flip-flop 3022 to high logic level, and the high level signal from the comparator 3021 may reset the control signal at Q output terminal of RS flip-flop 3022 from high logic level to low logic level to turn on and off. If the sense signal $V_{CS}$ reflecting as the voltage value at node 101 on sense resistor Rs in FIG. 1 is transmitted to the positive input terminal of comparator 3021, and a reference voltage $V_{TH}$ is fed in the negative input terminal, when the current on the primary winding is too large and exceeds the limit, i.e., the sense signal $V_{CS}$ is large than the reference voltage $V_{TH}$, the comparator 3021 will send high logic level to make RS flip-flop 3022 to turn off the main switch QM, which is the current control mode in Flyback voltage converter. The reference voltage $V_{TH}$ can be a preset voltage, and it can also be an output voltage obtained after comparing the divided voltage from the output voltage $V_{OUT}$ through a divider with a threshold voltage $V_{REF}$ through an error amplifier.

As shown in FIG. 1 and FIG. 6, in order to detect the primary current flowing through the sense resistor $R_S$ connected in series with the primary winding 130A and the corresponding voltage sense signal $V_{CS}$ at node 101 on sense resistor $R_S$, an acquisition unit 280 is provided in the voltage converter of the present invention. At the end of the active state of leading edge blanking signal LEB, i.e., at the falling edge of LEB signal in FIG. 3 turning from high level to low level at time $t_{12}$, the acquisition unit 280 measures the instantaneous voltage value applied on the sense resistor $R_S$, i.e., the instantaneous voltage value at $t_{12}$ of voltage sense signal $V_{CS}$ at node 101 referred as the first voltage value $V_{LEB}$ to shield the initial spike of the primary current.

The acquisition unit 280 includes at least one detection module 201 for detecting and obtaining the voltage value at different times on sense resistor $R_S$. Because the product of primary current $I_P$ flowing through the primary winding 130A and the resistance of sense resistor $R_S$, which is the sense signal $V_{CS}$ ($V_{CS}=I_P \times R_S$), reflecting as the voltage value across the sense resistor $R_S$, the detection module 201 is also a current detector. As an input buffer, the first voltage follower 401 of the detection module 201 has the high input impedance to connect with the signal source of sense signal $V_{CS}$ giving effective isolation of the output from the signal source, and the low output impedance to reduce the capture time of the sensing signal $V_{CS}$. The positive input end of the first voltage follower 401 is connected to node 101 at one end of sense resistor $R_S$, and the negative input end is connected to its output end, thus the follower 401 is an operational amplifier configured as a voltage follower or a unity gain buffer. Optionally, a resistor RIO can be connected between node 101 and the positive input terminal of the first voltage follower 401, and a capacitor $C_1$ is connected between the positive input terminal of the first voltage follower 401 and the ground, so that a sense signal $V_{CS}$ can be transmitted into the positive input terminal of the first voltage follower 401.

In addition, the acquisition unit 280 also includes a sample and hold latch 202 with a storage capacitor $C_2$, and a first switch SW1 connected between the output end of the first voltage follower 401 and the ungrounded end of the storage capacitor $C_2$ at node 122, while the other end of the storage capacitor $C_2$ is grounded. The first switch SW1 and other switches in the power system of the present invention are all electronic switches of three ports, such as P type and N type MOS transistors or bipolar transistors or junction field effect transistor switch or combination thereof etc., which can be enhanced or depletion mode. When the first switch SW1 is turned on, the output voltage value of the first voltage follower 401 may be stored on the capacitor $C_2$, and when the SW1 is turned off, the capacitor $C_2$ will not receive the voltage sent from the detection module 201. The LEB signal is applied to the control terminal, such as gate electrode, of the SW1, thus the LEB signal is in high logic level from time point $t_{11}$ to $t_{12}$, during which the SW1 is turned on.

In any cycle of the main switch QM, from $t_{11}$ when the switch QM starts to turn on to $t_{12}$ when the LEB signal changes from high level to low level, the sense signal $V_{CS}$ is fed to the first voltage follower 401 and is dynamically rising, and once the LEB signal changes from high level to low level at $t_{12}$ the first switch SW1 is turned off, after $t_{12}$ and before the LEB signal changes from low level to high level again, the first voltage follower cannot change the original voltage value at node 101 into secondary voltage and the sense signal $V_{CS}$ is transferred to the sample and hold latch 202. The analog sense signal $V_{CS}$ at $t_{12}$ is tracked and captured by detection module 201, and the actual transient voltage at node 101 of the voltage sense signal $V_{CS}$ is sent at the output terminal of the first voltage follower 401 to the storage capacitor $C_2$, which equals to the resistance of the sense resistor $R_S$ multiplying the blanking current value $I_{LEB}$, thus the storage capacitor $C_2$ of sample and hold latch 202 is charged and the sense signal $V_{CS}$ is stored on the storage capacitor $C_2$. Through this scheme, during the period from $t_{12}$ to the time when the LEB signal changes back to high level, the sample and hold latch 202 is separated from the detection module 201, and the sample and hold latch 202 only stores the transient voltage sense signal $V_{CS}$ on the sense resistor $R_S$ at $t_{12}$, thus the final voltage value transmitted to the sample and hold latch 202 from the first voltage follower 401 in cycle $T_S$ is a fixed voltage value represented by the $I_{LEB}$ at $t_{12}$, which is recorded as the first voltage $V_{LEB}$.

The acquisition unit 280 also comprises a second voltage follower 402 having its positive input terminal connected to node 122 with the voltage data stored on the capacitor $C_2$ and its negative input terminal connected to the output end of the second voltage follower 402, so that the second voltage follower 402 is also an operational amplifier configured as a voltage follower and a unity gain buffer. As an output buffer, the second voltage follower 402 has the high input impedance to prevent the voltage in the storage capacitor from lowering, and has the low output impedance to connect with the load, and thus the second voltage follower 402 will generate the first voltage $V_{LEB}$ stored at node 122 to the next level.

In FIG. 7, the first voltage value $V_{LEB}$ on the sense resistor $R_S$ at time $t_{12}$ when LEB signal changes from high level to low level obtained from the output terminal of the second voltage follower 402 is transmitted to the positive input end of a comparator 501, and the reference $V_{TH}$ mentioned above is transmitted to the negative input terminal of the comparator 501, thus the comparison results from the comparator 501 is transmitted to the oscillator 301 triggering the oscillator 301. When the comparison result of comparator 501 is low level, i.e., the first voltage value $V_{LEB}$ does not exceed the reference voltage value $V_{TH}$, the oscillator 301 is in the first operating mode under normal condition, and the oscillator 301 generates clock signal CLK with a first frequency determining the switching cycle of the switch QM under a first operating mode. In contrast, when the comparison result of comparator 501 is high level, i.e., the first voltage value $V_{LEB}$ is greater than the reference voltage $V_{TH}$, the oscillator 301 will lower the output frequency and enter into a second operating mode, and the oscillator 301 generates the clock signal CLK with a second frequency determining the switching cycle of the switch QM under the second operating mode.

In the start-up phase of the voltage converter, when the primary current $I_P$ produces the first voltage value $V_{LEB}$ on the sense resistor $R_S$ at $t_{12}$ greater than the reference voltage $V_{TH}$ resulting the inrush current at the primary side of the transformer, the comparison result on comparator 501 immediately triggers the oscillator 301 operating in the second operating mode, thus the second frequency of the clock signal CLK is less than the first frequency when the oscillator 301 is under the first operating mode. For example, the second frequency may be half of the first frequency, or even lower. Different from the normal first operating mode, in the second operating mode the oscillator 301 is forced to operate and the clock frequency of the oscillator 301 is lowered correspondingly to reduce the frequency of the control signal generator 302 of generating control signal, resulting the time period when the switch QM is turned off in the specific cycle of over-current of the primary current being longer than the time period when the switch QM in the normal cycle when there is no over-current situation (for example, when the oscillator 301 is in the first operating mode) to prevent the primary current $I_P$ from exceeding the target values and to overcome the inrush current problem of the conventional voltage converter. After the oscillator 301 reduced the frequency of the clock signal CLK, the primary current flowing through the primary winding exceeding a preset value is prevented, and the product of the pre-set value multiplying the resistance on the sense resistor Rs will not exceed the reference voltage value $V_{TH}$.

As shown in FIG. 8, in start-up phase of the voltage converter, the primary current waveform 371 of a voltage converter without using the device and method of the present invention can easily increase larger than the target value, and the corresponding sense signal $V_{CS}$ exceeds the reference voltage $V_{TH}$. In contrast, the primary current waveform 372 of a voltage converter using the device and method of the present invention is maintained within the target value, as such the inrush current is suppressed and the circuit is protected. With the present invention technology, when the voltage converter has no over-current in the primary side, for example, when the clock signal CLK from the oscillator 301 has first frequency, the primary current waveform 382 shown in FIG. 9 is maintained within the target value, however, in the existing technology, the primary current waveform 381 generating sub-harmonic noises and other phenomena, even though the protection device for start-up phase is used, it may still trigger the protection device wrongly once the converter enters the heavy load phase. Thus, in the present invention, within a cycle, the LEB signal can change from low level to high level at the time or slightly before the time when the control signal turns on the main switch QM. Although in the existing technologies and even in the present invention's technology, a main purpose of using the LEB circuit is to ignore the initial spike of the sense signal $V_{CS}$ produced on the resistor $R_S$ at the start-up phase of the main switch QM thus preventing the switch QM from turning off prematurely by mistake within each cycle, the LEB circuit is also used in the present invention to prevent the inrush current flowing through the primary winding from exceeding the target value.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature, whether preferred or not, may be combined with any other feature, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

The invention claimed is:

1. A control circuit for suppressing excessive current in a voltage converter having a main switch controlling a primary current passing through a primary winding of a transformer, comprising:
    an acquisition unit for measuring a first voltage applied on a sense resistor connected in series with the primary winding at a moment an active state of a leading-edge blanking (LEB) signal for shielding an initial spike of the primary current ends, wherein the acquisition unit comprises
        i. a first voltage follower transmitting the first voltage to a sample and hold latch of the acquisition unit for storage at the moment the active state of the LEB signal ends within each cycle, and
        ii. a second voltage follower sending out the first voltage stored in the sample and hold latch;
    a comparator having a non-inverting input end connected to the first voltage and an inverting input end connected to a reference voltage; and
    an oscillator connected to the output of the comparator, wherein a comparison result from the comparator is transmitted to and the comparison result triggers the oscillator to transmit a clock signal at a reduced frequency for preventing the primary current flowing through the primary winding of the transformer from exceeding a pre-set value when the first voltage exceeds the reference voltage.

2. The control circuit of claim 1, wherein
    when the first voltage doesn't exceed the reference voltage, the oscillator generates a clock signal at a first frequency in a first mode of operation to determine a switching cycle of the main switch; and
    when the first voltage exceeds the reference voltage, the oscillator generates a clock signal at the second frequency in a second mode of operation to determine the switching cycle of the main switch, wherein the second frequency is lower than the first frequency.

3. The control circuit of claim 2, wherein the second frequency is not more than a half of the first frequency.

4. The control circuit of claim 1, wherein at a moment the LEB signal changing from high level to low level, the acquisition unit measures a voltage applied on the sense resistor representing the first voltage at the moment the active state of the LEB signal ends.

5. The control circuit of claim 1, wherein a positive input end of the first voltage follower is coupled to a common node connecting the sense resistor and the main switch, wherein a voltage sensing signal reflecting the primary current flowing through the sense resistor is sent to the positive input end of the first voltage follower.

6. The control circuit of claim 5 further comprises a first switch controlled by the LEB signal connected between an output end of the first voltage follower and the sample and hold latch, wherein the first switch is turned off at the moment the active state of the LEB signal ends such that an voltage stored in the sample and hold latch maintaining on a transient level of the first voltage that is applied on the sense resistor at the moment the active state of the LEB signal ends after the LEB signal changes from high level to low level during each switching cycle of the main switch.

7. The method of claim 1, wherein a positive input end of the first voltage follower is coupled to a common node connecting the sense resistor and the main switch, wherein a voltage sensing signal reflecting the primary current flowing through the sense resistor is sent to the positive input end of the first voltage follower.

8. The method of claim 7, wherein a first switch controlled by the LEB signal is connected between an output end of the first voltage follower and the sample and hold latch, wherein turning off the first switch at the moment the active state of LEB signal ends maintaining a voltage value stored on the sample and hold latch on a transient level of the first voltage that is applied on the sense resistor at the moment the active state of the LEB signal ends after the LEB signal changes from high level to low level during each switching cycle of the main switch.

9. A method for suppressing excessive current in a voltage converter using a main switch to control a primary current passing through a primary winding of a transformer comprising:
    using an acquisition unit to measure a first voltage value applied on a sense resistor connected in series with the primary of winding of the transformer at a moment an active state of a LEB signal to shield an initial spike of the primary current ends, wherein the acquisition unit comprises
        a first voltage follower that transfers the first voltage to a sample and hold latch for storage at the moment the active state of the LEB signal ends within each cycle; and
        a second voltage follower that sends out the first voltage stored in the sample and hold latch;
    comparing the first voltage to a reference voltage; and
    using a comparison result to trigger an oscillator, wherein when the first voltage exceeds the reference voltage, the comparison result triggers the oscillator transmitting a clock signal at a reduced frequency for to prevent the primary current flowing through the primary winding from exceeding a pre-set value.

10. The method of claim 9, wherein when the first voltage doesn't exceed the reference voltage, the oscillator generates a clock signal at a first frequency in a first mode of operation to determine a switching cycle of the main switch that controls the primary current passing through the primary winding; and when the first voltage value exceeds the reference voltage, the oscillator generates a clock signal at a second frequency in a second mode of operation to determine the switching cycle of the main switch, wherein the second frequency is lower than the first frequency.

11. The method of claim 10, wherein the second frequency is not more than a half of the first frequency.

12. The method of claim 9, wherein, at a moment the LEB signal changing from high level to low level, the acquisition unit measures the first voltage value applied on the sense resistor at the moment the active state of the LEB signal ends.

* * * * *